United States Patent
Senevirathne et al.

(10) Patent No.: US 9,391,799 B2
(45) Date of Patent: Jul. 12, 2016

(54) MULTICAST HANDLING IN A TRANSPARENT INTERCONNECT OF LOTS OF LINKS BASED DATA CENTER INTERCONNECT

(71) Applicant: Cisco Technology, Inc., San Jose, CA (US)

(72) Inventors: Tissa Senevirathne, Sunnyvale, CA (US); Dinesh G. Dutt, Sunnyvale, CA (US); Ashok Ganesan, San Jose, CA (US); Les Ginsberg, Mount Hermon, CA (US)

(73) Assignee: Cisco Technology, Inc., San Jose, CA (US)

(*) Notice: Subject to any disclaimer, the term of this patent is extended or adjusted under 35 U.S.C. 154(b) by 426 days.

(21) Appl. No.: 13/654,448

(22) Filed: Oct. 18, 2012

(65) Prior Publication Data

US 2014/0112202 A1    Apr. 24, 2014

(51) Int. Cl.
*H04L 12/46* (2006.01)
*H04L 12/761* (2013.01)
*H04L 12/721* (2013.01)
*H04L 12/753* (2013.01)

(52) U.S. Cl.
CPC ............. *H04L 12/462* (2013.01); *H04L 45/16* (2013.01); *H04L 45/48* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 2013/0070766 A1* | 3/2013 | Pudiyapura | 370/390 |
| 2013/0182581 A1* | 7/2013 | Yeung et al. | 370/244 |
| 2013/0195111 A1* | 8/2013 | Allan et al. | 370/395.53 |
| 2014/0071987 A1* | 3/2014 | Janardhanan et al. | 370/390 |

OTHER PUBLICATIONS

Senevirathne, et al. "Approach for Multilevel TRILL," dated Feb. 21, 2012, 24 pages. Obtained at: http://www.ietf.org/id/draft-tissa-trill-multilevel-00-txt.
Li, et al. "IS-IS Extensions for Traffic Engineering," RFC 5305, dated Oct. 2008, 18 pages.
Touch, et al. "Transparent Interconnection of Lots of Links (TRILL): Problem and Applicability Statement", RFC 5556, dated May, 2009, 18 pages.

* cited by examiner

*Primary Examiner* — Habte Mered
(74) *Attorney, Agent, or Firm* — Merchant & Gould P.C.

(57) ABSTRACT

In some embodiments, a global tree structure identifying rendezvous points between a layer 1 network area and a layer 2 network area may be created. When the rendezvous point receives a data packet associated with a destination for the layer 1 network area from the layer to network area, it may forward the data packet to the destination. Non-rendezvous point devices may discard copies of the data packet.

20 Claims, 4 Drawing Sheets

MULTICAST HANDLING IN A TRANSPARENT INTERCONNECT OF LOTS OF LINKS BASED DATA CENTER INTERCONNECT

BACKGROUND

Interconnections of different network devices (e.g., Hosts, Servers,) in large data centers require careful handling of unicast and multicast forwarding tables to avoid unmanageable table sizes as the data center scales upward in size. These forwarding tables are required to maintain lists of which devices are attached to which ports so that network traffic can be delivered across those ports associated with the traffic's multicast or unicast destination address. Under the Transparent Interconnect of Lots of Links (TRILL) standard, TRILL switches (also called routing bridges or RBridges) maintain a link state protocol amongst themselves in which connectivity is broadcast to all of the RBridges allowing each RBridge to know about all the other RBridges and the connectivity between them. This gives the RBridges enough information to compute pair-wise optimal paths for unicast traffic, and to calculate distribution trees for delivery of traffic either to destinations whose location is unknown or to multicast/broadcast groups. Conventional approaches attempt to address the table size management problem by assigning 'nicknames' to different areas of the network. At the borders between areas, the nicknames of local RBridges are translated to an assigned switch nickname of the area and vice versa. Under the TRILL standard, however, multicast data is forwarded along a logical tree that spans across all participating RBridges, creating a number of border crossings that result in an unfavorable performance degradation as the nickname translations are performed.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
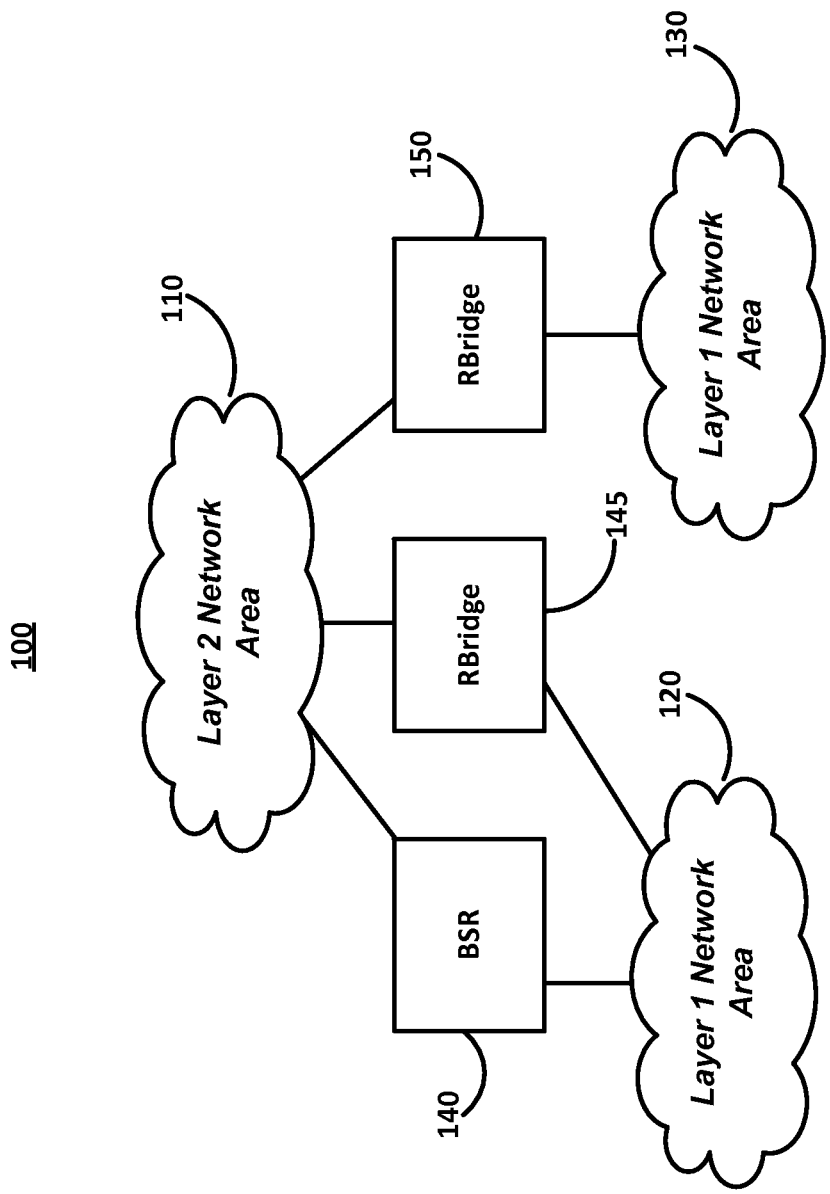
FIG. 1 is a block diagram of an operating environment.

Consistent with embodiments of the present disclosure, systems and methods are disclosed for providing multicast packet handling.

In some embodiments, a routing device may be selected as a rendezvous point between a layer 1 network area and a layer 2 network area. When the rendezvous point receives a data packet associated with a destination for the layer 1 network area from the layer to network area, it may forward the data packet to the destination. Non-rendezvous point devices may discard copies of the data packet.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Transparent Interconnect of Lots of Links (TRILL) standard maintains a Layer 2 link state protocol among the Router Bridges, or RBridges, that serve to connect network devices communicating over a widespread network area. This widespread network area may also be referred to as a campus. The campus may be separated into segments, each of which may support a large number of network devices. For example, different segments may comprise different buildings of a physical campus and/or may represent more widely dispersed geographic locations. Segments may be physically located in the same area, but represent different utilizations, such as a testing segment and a production segment.

Each segment may be served by one and/or more RBridges connecting the network devices on each segment to a backbone that interconnects the segments. The routing of multicast packets across the devices in the campus (i.e., packets that are sent from a single source device to multiple destination devices) relies on reverse path forwarding (RPF) to ensure loop-free forwarding of packets. In some situations, a multicast packet may reach a particular network device, such as a router, multiple times. Each packet that is received is therefore checked against a list of networks that are reachable via the interface on which the packet was received. These networks form the reverse path of the packet. If the device finds a matching routing entry for the source RBridge nickname of the multicast packet, the RPF check passes and the packet may be forwarded to all other interfaces on the device that are participating the packet's multicast group. If the RPF check fails, however, the packet will be dropped. Thus, RPF only allows for forwarding of packets that come into the interface that also hold the routing entry for the source of the packet, thus breaking any loop.

Because each device may only accept and/or forward packets for from devices in the packet's reverse path, a global tree structure may be created and maintained that spans the entire campus to allow each device in the campus to accept and/or forward packets from other devices in the campus. The global tree may comprise two segments; a single backbone tree in the core of the network and one or more local trees for each local area. The backbone tree comprises RBridges in the core of the network—the Layer 2L2) Area). Local area trees comprise the RBridge for the area. The global tree is constructed by connecting local area trees to the backbone tree at each rendezvous point (RP) RBridge. Devices in the backbone thus know to accept multicast packets for forwarding from each of these RP RBridges.

The RP RBridge is responsible for maintaining a local tree for its network segment. The RP RBridge identifies itself to all of the devices within its local tree as a default multicast gateway. The devices within the local tree may then accept multicast packets whose source nickname is unresolved as long as the packet was forwarded to them by the RP RBridge.

Multicast tree allocation and management between Layer 1 (L1) areas and Layer 2 (L2) areas requires close coordination to ensure proper loop free forwarding of packets. Consistent with embodiments of this disclosure, a Boot Strap RBridge (BSR) approach may be used to provide coordination in selecting rendezvous point (RP) RBridges.

TRILL networks constrain broadcast and unknown unicast forwarding to only to a subset of network areas that have a global reach. Thus, the TRILL network provides connectivity between such global trees across L2 and L1 areas. Local trees are only limited to the local area and do not forward traffic beyond their area boundaries. All multicast trees, whether local or global, may be assigned a unique nickname to avoid and erroneous forwarding. These nicknames may be derived on a per area basis.

Multicast trees in TRILL networks are identified by their nickname. The backbone area tree segment and local area tree segments that are part of the same global tree may represented by the same nickname. This representation avoids the need for nickname translation at the rendezvous point (RP) RBridge.

Global trees are rooted in the L2 area with a separate local tree for each L1 area. The local trees in each L1 area is rooted on one of the L1/L2 border RBridges of that area. This RBridge is called the Rendezvous Point RBridge (RP-RB). The RP-RB may be appointed by a Boot Strap RBridge (BSR). There is an RP-RB per each global (L2) tree, and a given RBridge may also serve as RP for multiple global trees. RP-RB route multicast traffic between global trees and local trees.

The BSR provides coordination between RP-RBs and allocates multicast trees that they will be servicing. Each BSR is elected for a given L2 area and comprises a border router between L1 and L2. Each Border RBridge announces itself and its priority to become BSR. The L1 area each RBridge desires to service may also be encoded within the announcement. If there are multiple L1 areas a given RB may service, then a separate announcement probe may be generated for each area. Announcement probes are sent to the L2 area, not the L1 areas. The RBridge with the highest priority and/or the highest nickname is elected as the BSR. If a new RBridge joins the L2 area, it may send a request to the BSR to join a list of candidates to become an RP-RB.

The BSR may send periodic multicast announcements to announce that it is still alive and in service. The BSR may designate a backup BSR to take over in case the 'still alive' announcement is not received within a configurable time frame.

The BSR identifies a set of RBridges {R1} that are attached to the same area and have L2 adjacency to the BSR, such as with candidate RP registration and ISIS L2 reachability. The BSR may then identify a second set of RBridges {R2} within set {R1} that it can reach via L1 area and a third set of RBridges {R3} that are not reachable via L1. If {R3} is not an empty set, this may indicate a L1 area partition. The BSR also identifies a fourth set {R4} of RBridges for the area that it can reach via L1 but not L2. The BSR now has all possible L1/L2 border RBridges for a given area in one of the four sets via either configuration and/or other means (e.g., type-length-value announcements). The BSR may assign, per each global tree, a single RBridge in list {R2} and {R3} as Rendezvous Points.

FIG. 1 is a block diagram view of an operating environment 100 for providing multicast packet handling. Operating environment 100 may comprise a Layer 2 (L2) Area 110, a first Layer 1 (L1) Area 120, and a second L1 Area 130. Operating environment 100 may further comprise a Boot Strap RBridge (BSR) 140, a first RBridge 145, and a second RBridge 150. BSR 140 may assign first RBridge 145 as the Rendezvous Point (RP) for first L1 Area 120 and a second RBridge 150 as the RP for second L1 area 130.

First RBridge 145 may then announce itself as the RP between global L2 Area 110 and local first L1 Area 120. To accomplish proper reverse path forwarding (RPF), first RBridge 145 may make two affinity type-length value (TLV) announcements. TLV elements allow the encoding of optional information within a data communication protocol. First RBridge 145 may announce its first L1 area 120 affinity to other devices connected to the global L2 area 110. First RBridge 145 may also announce itself to first L1 area 120 as a gateway to L2 area 110. This allows L2 RBridges in global L2 area 110 to install RPF routing entries for all packets out of first L1 Area 120 and into L2 area 110 to appear as if they originated from first RBridge 145. Other, non-RP RBridges in L1 Area 120 may install a default route towards first RBridge 145 for all traffic destined for L2 area 110. All other RBridges in list {R2} may block ingress/egress traffic to L2 Area 110 from first L1 area 120.

Figure 2:
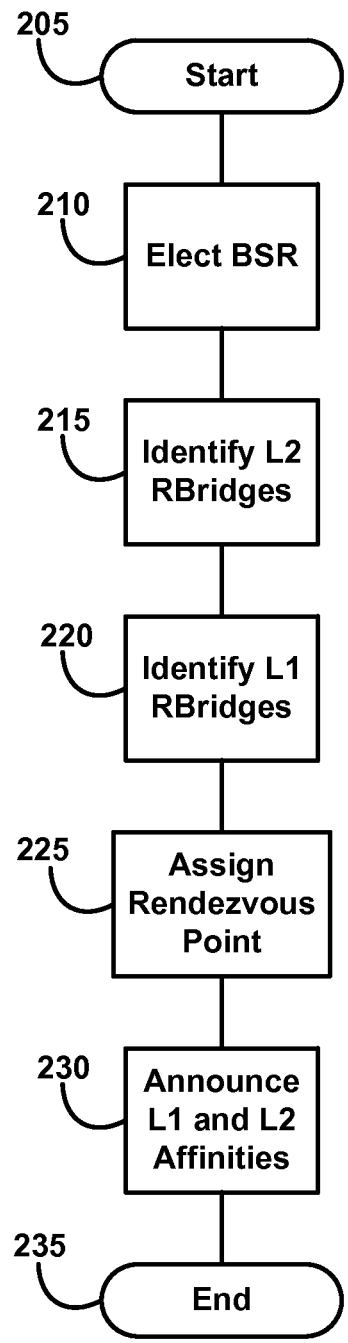
FIG. 2 is a flow chart illustrating a method for providing multicast packet handling.

FIG. 2 illustrates a flow chart setting forth the general stages involved in a method 200 consistent with an embodiment of the disclosure for providing multicast packet handling. Method 200 may be implemented using the components illustrated in operating environment 100 as described above. Ways to implement the stages of method 200 will be described in greater detail below. Method 200 begins at starting block 205 and proceeds to stage 210 where a computing device 300 may elect a Bootstrap RBridge (BSR). The BSR provides coordination between rendezvous points and allocates the multicast trees that they will be servicing. For the election, each RBridge on the border of a layer 1 network area and a layer 2 network area announces itself and its priority to become the BSR via its Layer 2 multicast address. The L1 area each RBridge desires to service is also encoded within the announcement. The RBridge with the highest priority, or the highest nickname in the case of equal priority, wins the BSR election.

Method 200 may then advance to stage 215 where computing device 300 may identify RBridges that are connected to the layer 2 network area. For example, BSR 140 may identify first RBridge 145 and second RBridge 150 as being in communication over the layer 2 network area.

Method 200 may then advance to stage 220 where computing device 300 may identify any RBridges that are also in communication via a layer 1 network area. For example, BSR 140 may identify first RBridge 145 as in communication via first layer 1 network area 120, while second RBridge 150 is not in communication via the same layer 1 network area.

Method 200 may then advance to stage 225 where computing device 300 may assign RBridges as rendezvous points (RPs) for their respective layer 1 network areas. For example, BSR 140 may assign first RBridge 145 as the RP between layer 2 network area 110 and first layer 1 network area 120 and may assign second RBridge 150 as the RP between layer 2 network area 110 and second layer 1 network area 130.

Method 200 may then advance to stage 230 where computing device 300 may announce the RPs' affinities. For example, first RBridge 145 may announce to devices connected to first layer 1 network 120 that it has affinity for layer 2 network area 110 and will act as a gateway for devices coupled to first layer 1 network area 120 to send traffic across the layer 2 network area. Second RBridge 150 may similarly announce its affinity to second layer 1 network area 130. First RBridge 145 and Second RBridge 150 may also announce to devices coupled to layer 2 network area 110 that they have affinity for their respective layer 1 network areas and that network traffic destined for devices coupled to those local layer 1 network areas should be directed to them for forwarding. Other RBridges that may be coupled between the layer 1 and layer 2 network areas that receive multicast traffic destined to cross the border between those network area may simply discard those packets. Method 200 then ends at stage 235.

Figure 3:
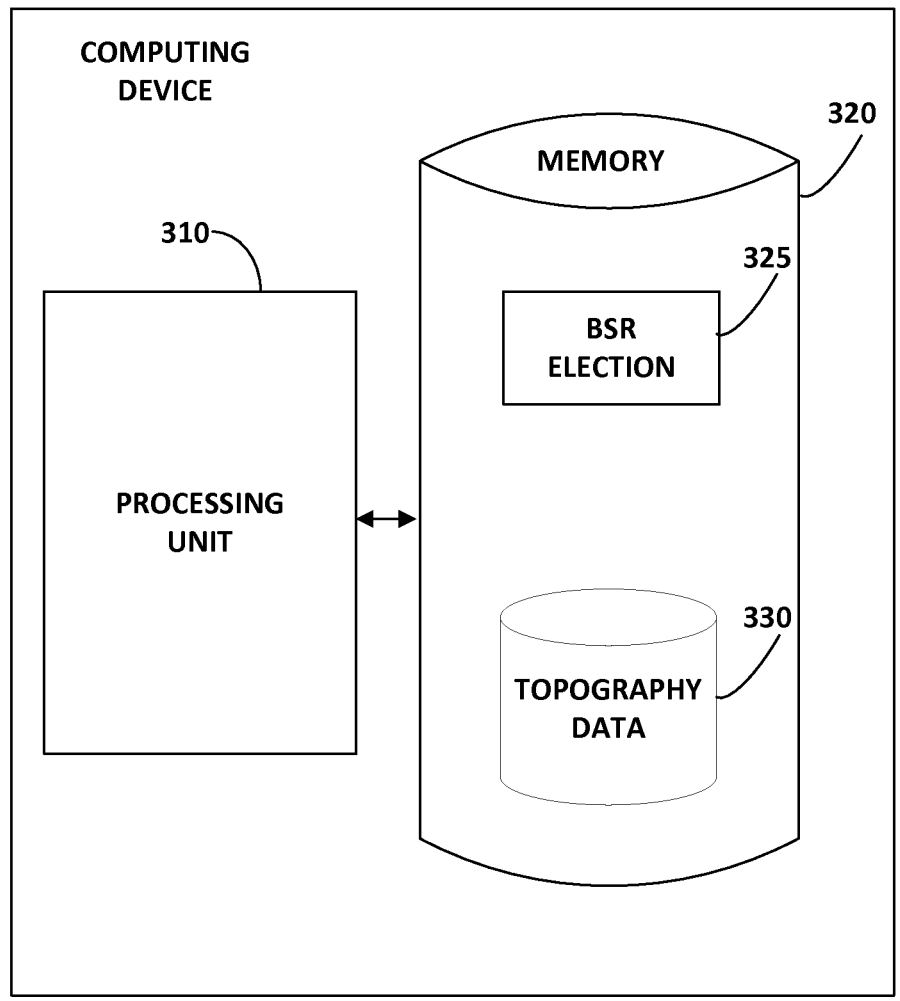
FIG. 3 is a block diagram illustrating components of a computing device.

FIG. 3 illustrates computing device 300 comprising a processing unit 310 and a memory unit 320. Memory 320 may include executable software to provide a bootstrap RBbridge (BSR) election algorithm 325 that may elect a BSR based on a collection of network topography data 330 associated with devices connected to layer 2 network area 110. While executing on processing unit 410, these and other software modules and/or data sources may perform processes for providing redundancy elimination in web caching, for example, via one or more stages included in method 200 described above with respect to FIG. 2. Moreover, any one or more of the stages included in method 200 may be performed on any element shown in operating environment 100 and each of the elements illustrated in operating environment 100 may comprise a similar computing device to that illustrated by FIG. 3.

Computing device 300 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 4:
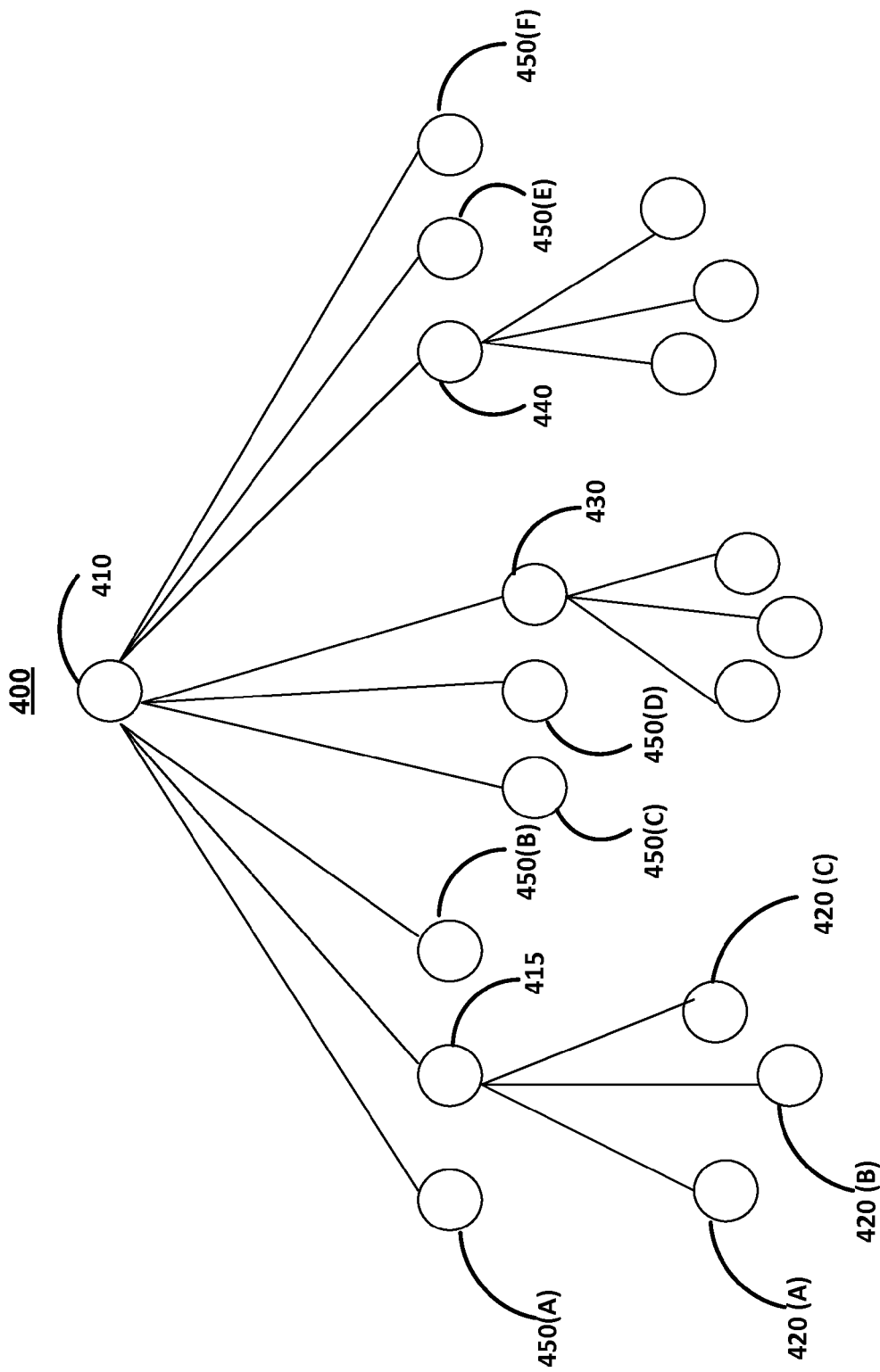
FIG. 4 is an illustration of a logical view of a global tree structure.

FIG. 4 is an illustration of a logical view of a global tree structure 400. Global tree structure 400 may comprise a root node 410 for the global tree that identifies a first local area rendezvous point (RP) 415. First local area RP 415 provides connectivity between a global, L2 network associated with root node 410 and a plurality of local network devices 420 (A)-(C). Root node 410 may similarly identify a second local area RP 430 and a third local area RP 440 and/or a plurality of network devices 450(A)-(F) connected directly to the global L2 network and not acting as rendezvous points.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
creating a global tree structure identifying a plurality of network devices;
selecting, according to the global tree structure, a routing device as a rendezvous point between a first network area and a second network area, wherein the first network area comprises a first subset of the plurality of network devices, wherein the second network area comprises a second subset of the plurality of network devices, and wherein selecting the rendezvous point comprises:
determining a first set of routing devices that are attached to the first network area,
determining a second set of routing devices within the first set of routing devices that are attached to the second network area, and
selecting a routing device from the determined second set of routing devices as the rendezvous point;
discarding, by all of the determined second set of routing devices except for the rendezvous point, all packets destine to cross between the first network area and the second network area;
receiving, by the rendezvous point, a data packet associated with a destination comprising at least one of the first plurality of network devices, wherein the data packet was received from at least one of the second plurality of network devices; and
forwarding the data packet to the at least one of the first plurality of network devices.

2. The method of claim 1, wherein each of the first subset of the plurality of network devices maintains a routing table and wherein the routing table does not identify the at least one of the second plurality of network devices.

3. The method of claim 1, further comprising generating a local tree database comprising the first plurality of network devices.

4. The method of claim 1, wherein the first network area comprises a layer 1 network area.

5. The method of claim 4, wherein the second network area comprises a layer 2 network area.

6. The method of claim 5, wherein the routing device comprises one of a plurality of routing bridges associated with the second routing area.

7. The method of claim 6, further comprising electing a bootstrap routing device from among the plurality of routing bridges.

8. The method of claim 7, wherein the bootstrap routing device is operable to designate the routing device as the rendezvous point.

9. The method of claim 5, further comprising:
receiving, by the rendezvous point, a second data packet associated with a second destination comprising at least one of the second subset of the plurality of network devices, wherein the data packet was received from at least one of the first plurality of network devices; and
forwarding the data packet to the at least one of the first subset of the plurality of network devices.

10. A non-transitory computer-readable medium encoded with software and when executed operable to:
identify a first set of routing devices of a global tree, wherein the first set of routing devices are communicatively reachable in a layer 2 network area in the global tree;
identify a second set of routing devices from the first set of network devices are communicatively reachable in a layer 1 network area forming a local tree;
identify a third set of routing devices within the first set of network devices that are not communicatively reachable via the layer 1 network area;
create a global tree structure identifying at least one routing path between the global tree and the local tree;
select, according to the global tree structure, one routing device from the second set of routing devices and the third set of routing devices as a rendezvous point between the layer 2 network area and the layer 1 network area; and
discard, by all of the determined second set of routing devices except for the rendezvous point, all packets destine to cross between the layer 2 network area and the layer 1 network area.

11. The non-transitory computer-readable medium of claim 10, wherein being operable to identify the first set of network devices comprises being operable to receive an IS-IS reachability type-length value (TLV) packet from each of the first set of network devices.

12. The non-transitory computer-readable medium of claim 11, wherein the IS-IS reachability TLV packet received from each of the first set of network devices comprises a priority value.

13. The non-transitory computer-readable medium of claim 12, wherein being operable to select the at least one of the second set of routing devices as the rendezvous point between the layer 2 network area and the layer 1 network area comprises being operable to determine that the IS-IS reachability TLV packet associated with the at least one of the second set of routing devices comprises a highest priority value of the IS-IS reachability TLV packets received from the second set of routing devices.

14. The non-transitory computer-readable medium of claim 10, wherein the software is, when executed, further operable to:

receive a registration request from a newly coupled routing device, wherein the registration request comprises a candidate priority value; and
insert the newly coupled routing device on a candidate list to become a new rendezvous point according to the candidate priority value.

15. An apparatus comprising:
a plurality of network interfaces;
a memory storage; and
a processor coupled to the memory storage, wherein the processor is configured to:
receive a data packet,
determine whether delivery of the data packet requires transmission across a border between a layer 1 network area and a layer 2 network area,
in response to determining that delivery of the data packet requires transmission across the border between the layer 1 network area and the layer 2 network area, elect a rendezvous point between the layer 1 network area and the layer 2 network area, wherein the processor being configured to elect the rendezvous point comprises the processor being configured to:
determine a first set of routing devices that are attached to the layer 2 network area,
determine a second set of routing devices within the first set of routing devices that are attached to the layer 1 network area,
elect a routing device from the determined second set of routing devices as the rendezvous point;
discard, by all of the determined second set of routing devices except for the rendezvous point, all packets destine to cross between the layer 2 network area and the layer 1 network area; and
in response to electing the rendezvous point between the layer 1 network area and the layer 2 network area, forwarding the data packet.

16. The apparatus of claim 15, wherein the data packet is received from the layer 1 network area.

17. The apparatus of claim 15, wherein the data packet is received from the layer 2 network area.

18. The apparatus of claim 15, wherein the processor is further configured to discard the data packet.

19. The apparatus of claim 15, wherein the processor is further configured to send, to a first plurality of network devices associated with the layer 1 network area, a type-length-value (TLV) packet announcing the apparatus as a gateway to the layer 2 network area.

20. The apparatus of claim 19, wherein the processor is further configured to send, to a second plurality of network devices associated with the layer 2 network area, a type-length-value (TLV) packet announcing the apparatus as the rendezvous point between the layer 1 network area and the layer 2 network area.

* * * * *